Patented Nov. 11, 1930

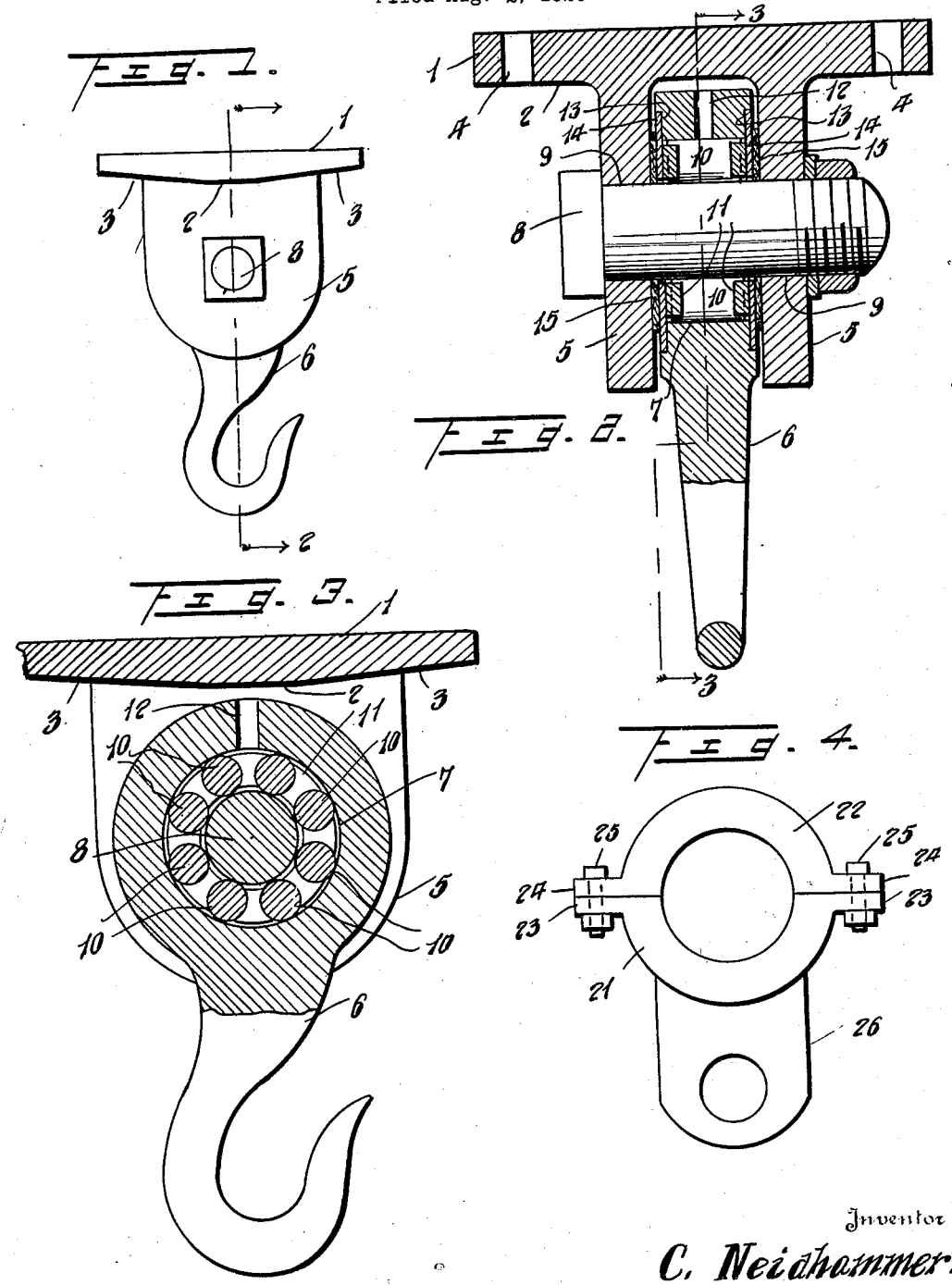

1,781,072

UNITED STATES PATENT OFFICE

CLYDE NEIDHAMMER, OF LEMOYNE, PENNSYLVANIA, ASSIGNOR OF ONE-HALF TO DAVID A. GRISSINGER, OF LEMOYNE, PENNSYLVANIA

SUSPENDING HOOK

Application filed August 2, 1928. Serial No. 297,027.

The invention relates to suspending hooks particularly adapted for use in supporting porch swings and the like and has for its principal object the provision of a hook that will prevent the wear of the hook and the chain secured thereto when in use and thus make safe the use of porch and other swings and hammocks.

A further object of the invention is the provision of a suspending hook for the purpose stated comprising a reinforced plate to be secured to a suitable supporting member and having spaced ears to receive a pivot pin on which is mounted the hook member having an opening to receive the pin, the opening being larger in diameter than the pin to receive an anti-friction roller bearing to insure swinging of the hook at all times when the swing is in operation and thus prevent wear on the hooks and supporting chains for the swing or hammock.

A further object of the invention is the provision in a hook of the character stated employing an anti-friction roller bearing to insure swinging of the hook member in which means is provided for lubricating the bearing, and the ends of the opening in the hook member forming the bearing are closed by means of offset washer plates to prevent leakage of the lubricant and felt or other washers arranged outside of the washer plates to absorb any lubricant that might leak from the journal box.

The invention will be described in detail hereinafter and will be found illustrated in the accompanying drawings in which Figure 1 is a side view in elevation of the improved suspending hook, Figure 2 is a transverse sectional view, on an enlarged scale, taken on a plane indicated by the line 2—2 of Figure 1, Figure 3 is a sectional view on a plane indicated by the line 3—3 of Figure 2, and Figure 4 is a view of a modified form of sustaining member adapted to be used with a pipe or rod to support the swing.

In the drawings similar reference characters are used to designate corresponding parts throughout the several views.

The invention comprises a plate 1 that is adapted to be secured to any suitable support, and having its longitudinal middle portion thickened as shown at 2 and tapered towards the side edges as shown at 3, this structure being designed to strengthen the plate where engaged by driven members (not shown) engaged through openings 4 in said thickened portion 2.

Formed integral with the plate 1 and arranged transversely to the thickened portion 2 and the tapered portion 3 are spaced ears 5 between which is pivotally mounted the hook member 6. Hook member 6 is provided with an enlarged opening 7 arranged transversely of the member 6 and to receive the pivot pin 8 secured in openings 9 in said ears 5. The opening 7 is considerably larger in diameter than the diameter of the pin 8, as shown, to provide a circumferential space in which are mounted anti-friction roller bearings 10 that may be of any suitable type but preferably of a type employing rings 11 engaging the ends of said rollers. 12 indicates an opening through the wall of the cylindrical opening 7 and communicating therewith through which suitable lubricant such as lubricating oil may be inserted in the opening 7 to lubricate the bearing and the engagement therewith with the pin 18 and the wall of the opening 7. The sides of the member 6 surrounding the opening 7 is formed with circumferential recesses 13 in which washer plates 14 are mounted and designed to retain the lubricant in the opening 7, 15 indicating other washers made of felt or other suitable absorbent material arranged between the washer plates 14 and the inner sides of the ears 5 to absorb any lubricant that might leak from the opening 7.

The form of the member shown in the modified view of Figure 4 is designed to be used where the swing or hammock is to be supported by a rod or pipe, and comprises mating semi-circular members 21 and 22 having outstanding ears 23 and 24 respectively to receive clamping bolts 25, the member 21 having ears 26 that will be spaced as hereinbefore shown and described relating to the ears 5, said ears being adapted to support the hook member which may be of the same construction as that heretofore referred to relating to the hook member 6.

What is claimed is:—

A suspending device, comprising an attaching plate, spaced ears on said plate, a pivot pin engaging said ears, a hook member having an opening to receive said pin, roller bearing members engaging the pin and the wall of the opening, said hook member having recesses on the opposite sides thereof surrounding said opening, washer plates engaging in said recesses and having openings to receive the pin, and the wall of said opening having a lubricating opening therein communicating with the first mentioned opening normally protected by the plate, and washers in contact with the first mentioned washers and said ears, the last mentioned washers functioning dually to maintain the first mentioned washers seated and to absorb leaking lubricant.

In testimony whereof I affix my signature.

CLYDE NEIDHAMMER.